United States Patent
Jarema et al.

(12)

(10) Patent No.: US 12,271,367 B1
(45) Date of Patent: *Apr. 8, 2025

(54) METHOD AND APPARATUS FOR COMPARING ROWS OF SUBSETS OF TWO DATABASE TABLES WITHOUT REGARD TO AN ORIGINAL ORDER OF ROWS IN EITHER DATABASE TABLE

(71) Applicant: Gravic, Inc., Malvern, PA (US)

(72) Inventors: Eugene P. Jarema, Downingtown, PA (US); Paul J. Holenstein, Downingtown, PA (US); Bruce D. Holenstein, Malvern, PA (US); Dylan R. Holenstein, Newtown Square, PA (US)

(73) Assignee: GRAVIC, INC, Malvern, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/747,171

(22) Filed: Jun. 18, 2024

Related U.S. Application Data (63) Continuation of application No. 17/862,669, filed on Jul. 12, 2022, now Pat. No. 12,019,611.

(51) Int. Cl.
*G06F 17/00* (2019.01)
*G06F 7/00* (2006.01)
(Continued)

(52) U.S. Cl.
CPC ...... *G06F 16/2358* (2019.01); *G06F 16/2255* (2019.01); *G06F 16/258* (2019.01)

(58) Field of Classification Search
CPC . G06F 16/2358; G06F 16/2255; G06F 16/258
(Continued)

(56) References Cited

U.S. PATENT DOCUMENTS

| 6,317,766 B1 * | 11/2001 | Grover .................... G06F 17/10 |
| | | 977/933 |
| 8,903,779 B1 | 12/2014 | Holenstein et al. |
| | (Continued) | |

OTHER PUBLICATIONS

Wikipedia entry for "Rsync." Downloaded from: <https://en.wikipedia.org/w/index.php?title=Rsync&oldid=1087552685> Last edited date: May 13, 2022, original posting date: unknown, 9 pages.

*Primary Examiner* — Pavan Mamillapalli
(74) *Attorney, Agent, or Firm* — Clark A. Jablon (57) ABSTRACT

A method and system are provided for comparing a first database table and a second database table with each other to produce a table of differences therebetween. The first database table and the second database table include one or more subsets of data that are intended to match each other, and the first database table and the second database table each include multiple rows. Indicia is generated for each of the multiple rows of a subset of the first database table, and each of the multiple rows of a subset of the second database table. The generated indicia for each of the multiple rows of the subset of the first database table are compared with the generated indicia for the subset of each of the multiple rows of the subset of the second database table, on a row-by-row basis, wherein the comparing occurs without regard to an original order of the rows in either the first database table or the second database table. Any generated indicia for each of the multiple rows of the subset of the first database table that are not present in the generated indicia for each of the (Continued)

Source (First) Table

| ROW | DATA | INDICIA |
|---|---|---|
| 1 | Smith, John | 12957 |
| 2 | Ø (NULL) | Ø |
| 3 | Sandy, Sue | 39241 |
| 4 | Jones, Bill | 89771 |
| 5 | Ø | Ø |
| 6 | Ø | Ø |
| 7 | Hill, David | 72141 |

Target (Second) Table

| ROW | DATA | INDICIA |
|---|---|---|
| 1 | Smith, John | 12957 |
| 2 | Ø | Ø |
| 3 | Jones, Bill | 89771 |
| 4 | Ø | Ø |
| 5 | Brown, Jack | 98327 |
| 6 | Sandy, Sue | 39241 |
| 7 | Hill, Dave | 92542 |

Example of a source and a target database table and the generated indicia for the rows of each table.

Details of the comparison operation for the example tables shown in Figure 4.

multiple rows of the subset of the second database table are identified as a first set of mismatched indicia. Any generated indicia for each of the multiple rows of the subset of the second database table that are not present in the generated indicia for each of the multiple rows of subset of the first database table are identified as a second set of mismatched indicia. The table of differences is populated with the generated indicia. The second database table may be repaired by using at least one of the first set of mismatched indicia and the second set of mismatched indicia.

31 Claims, 7 Drawing Sheets

(51) Int. Cl.
    *G06F 16/22*     (2019.01)
    *G06F 16/23*     (2019.01)
    *G06F 16/25*     (2019.01)

(58) Field of Classification Search
    USPC .......................................................... 707/625
    See application file for complete search history.

(56) References Cited

U.S. PATENT DOCUMENTS

| | | | |
|---|---|---|---|
| 9,020,987 B1* | 4/2015 | Nanda | G06F 16/1734 |
| | | | 707/821 |
| 9,804,935 B1 | 10/2017 | Holenstein et al. | |
| 9,830,223 B1 | 11/2017 | Holenstein et al. | |
| 10,152,506 B1 | 12/2018 | Hoffmann et al. | |
| 11,120,047 B1 | 9/2021 | Hoffmann et al. | |
| 12,019,611 B1* | 6/2024 | Jarema | G06F 16/2358 |
| 2004/0138921 A1* | 7/2004 | Broussard | G16H 70/40 |
| | | | 705/2 |
| 2009/0024656 A1* | 1/2009 | Wellman | G06F 16/258 |
| 2009/0037488 A1* | 2/2009 | Abrams | G06F 16/258 |
| 2015/0087392 A1* | 3/2015 | Guerrero | G07F 17/34 |
| | | | 463/20 |
| 2016/0275150 A1* | 9/2016 | Bournonnais | G06F 16/25 |
| 2016/0378752 A1* | 12/2016 | Anderson | G06F 16/2255 |
| | | | 707/747 |
| 2018/0276216 A1* | 9/2018 | Anderson | G06F 16/2255 |

\* cited by examiner

Figure 1: Prior Art - A Computer Application

Figure 2: Prior Art - An Active/Backup System

Figure 3: Prior Art - An Active/Active System

Source (First) Table

| ROW | DATA | INDICIA |
|---|---|---|
| 1 | Smith, John | 12957 |
| 2 | ∅ (NULL) | ∅ |
| 3 | Sandy, Sue | 39241 |
| 4 | Jones, Bill | 89771 |
| 5 | ∅ | ∅ |
| 6 | ∅ | ∅ |
| 7 | Hill, David | 72141 |

Target (Second) Table

| ROW | DATA | INDICIA |
|---|---|---|
| 1 | Smith, John | 12957 |
| 2 | ∅ | ∅ |
| 3 | Jones, Bill | 89771 |
| 4 | ∅ | ∅ |
| 5 | Brown, Jack | 98327 |
| 6 | Sandy, Sue | 39241 |
| 7 | Hill, Dave | 92542 |

Figure 4: Example of a source and a target database table and the generated indicia for the rows of each table.

Figure 5: Details of the comparison operation for the example tables shown in Figure 4.

| ROW | TABLE | DATA | INDICIA |
|---|---|---|---|
| 7 | First | Hill, David | 72141 |
| 7 | Second | Hill, Dave | 92542 |
| 5 | Second | Brown, Jack | 98327 |

Figure 6: Example of a table of differences generated from the comparison in Figure 5.

METHOD AND APPARATUS FOR COMPARING ROWS OF SUBSETS OF TWO DATABASE TABLES WITHOUT REGARD TO AN ORIGINAL ORDER OF ROWS IN EITHER DATABASE TABLE

CROSS-REFERENCE TO RELATED APPLICATIONS

This application is a continuation of copending U.S. Non-Provisional patent application Ser. No. 17/862,669 filed Jul. 12, 2022, which is incorporated by reference herein.

BACKGROUND OF THE INVENTION

Certain terms used in the "Background of the Invention" are defined in the "Definitions" section.

1.1 Computer Applications

Much of our daily lives is augmented by computers. The many services upon which we depend, our banking, communications, air and rail travel, online shopping, credit-card and debit-card purchases, mail and package delivery, and electric-power distribution, are all managed by computer applications.

Figure 1:
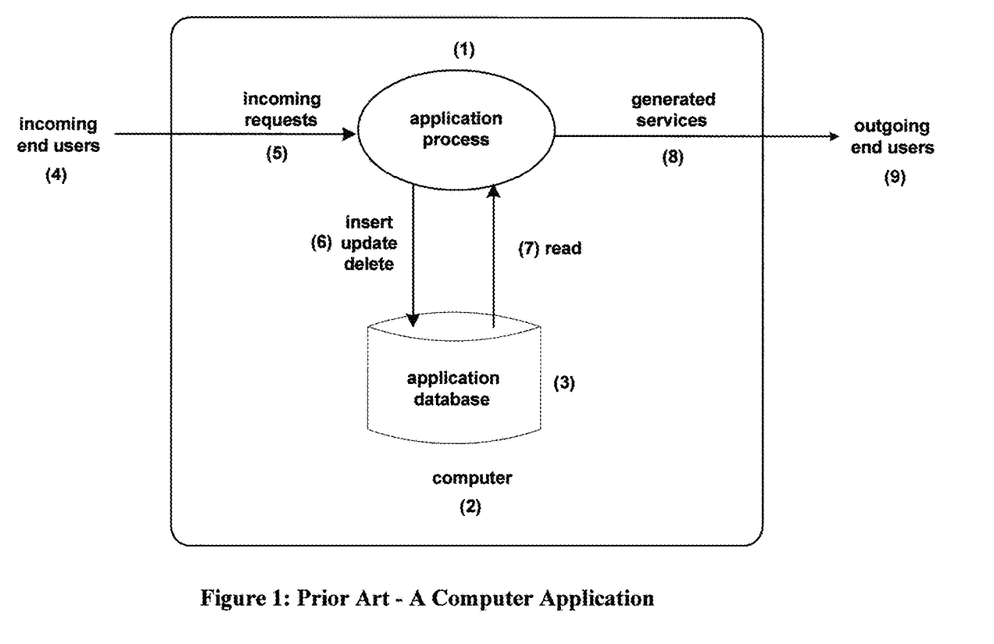
FIG. 1 shows a prior art computer application.

In its simplest form, as shown in FIG. 1, a typical computer application is generally implemented as one or more computer programs (1) running in a computer (2). A computer program is basically a set of computer-encoded instructions. It often is called an executable because it can be executed by a computer. A computer program running in a computer is called a process, and each process has a unique identification known to the computer. Multiple copies of the same computer program can be running in a computer as separately distinguishable processes.

An application typically includes multiple interacting processes.

1.2 Application Database

With reference to FIG. 1, an application often depends upon a database (3) of information that the application maintains to record its current state. Often, the information in the database is fundamental to the operation of the application, to the decisions it makes, and to its delivery of services to the end users.

The database may be stored in persistent storage such as a disk for durability, it may be stored in high-speed memory for performance, or it may use a combination of these storage techniques. The database may be resident in the same computer as the application program, it may be resident in another computer, it may be implemented as an independent system, or it may be distributed among many systems.

The information in the databases is frequently stored in one or more files or tables, and there are many ways of organizing the information contained in them. Each file or table typically represents an entity set such as "employees" or "credit cards." A file comprises records, each depicting an entity-set member such as an employee. A table comprises rows that define members of an entity set. A record comprises fields that describe entity-set attributes, such as salary. A row comprises columns that depict attributes of the entity set. In this specification, "files" are equivalent to "tables;" "records" are equivalent to "rows;" and "fields" are equivalent to "columns."

1.3 Requests

With further reference to FIG. 1, incoming end users (4) generate requests (5) to be processed by the computer application. End users may be people, other computer applications, other computer systems, or electronic devices such as electric power meters. In this specification, the term "end user" means any entity that can influence an application and/or can request or use the services that it provides.

An example of an incoming request from an end user is a request for a bank-account balance. Another example is an alert that a circuit breaker in a power substation has just tripped. In some cases, there may be no incoming request. For instance, a computer application may on its own generate random events for testing other applications.

1.4 Request Processing

As shown in FIG. 1, the application receives a request from an incoming end user (5). As part of the processing of this request, the application may make certain modifications to its database (6).

The application can read the contents of its database (7). As part of the application's processing, it may read certain information from its database to make decisions. Based on the request received from its incoming end user and the data in its database, the application delivers certain services (8) to its outgoing end users (9).

1.5 Services

A service may be delivered by an application process as the result of a specific input from an end user, such as providing an account balance in response to an online banking query. Another example of a service is the generation of a report upon a request from an end user.

The application program may also spontaneously deliver a service, either on a timed basis or when certain conditions occur. For instance, a report may be generated periodically. Alternatively, an alarm may be generated to operations staff if the load being carried by an electric-power transmission line exceeds a specified threshold.

The end users providing the input to the application may or may not be the same end users as those that receive its services.

1.6 Availability

The availability of a computer system and the services it provides is often of paramount importance. For instance, a computer system that routes payment-card transactions for authorization to the banks that issued the payment cards must always be operational. Should the computer system fail, credit cards and debit cards cannot be used by the card holders. They may be only able to engage in cash transactions until the system is repaired and is returned to service.

The failure of a 911 system could result in the destruction of property or the loss of life. The failure of an air-traffic control system could ground all flights in a wide area.

In mission-critical systems such as these, it is common to deploy two or more computer systems for reliability. Should one computer system fail, the other computer system is available to carry on the provisioning of services.

1.7 Redundant System

Figure 2:
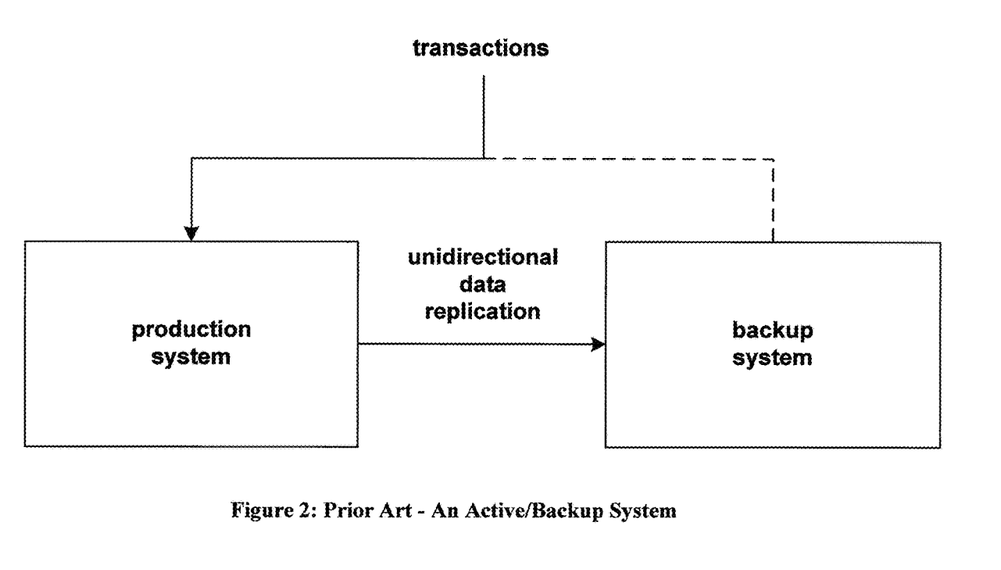
FIG. 2 shows a prior art active/backup system with nodes connected by a computer network.
Figure 3:
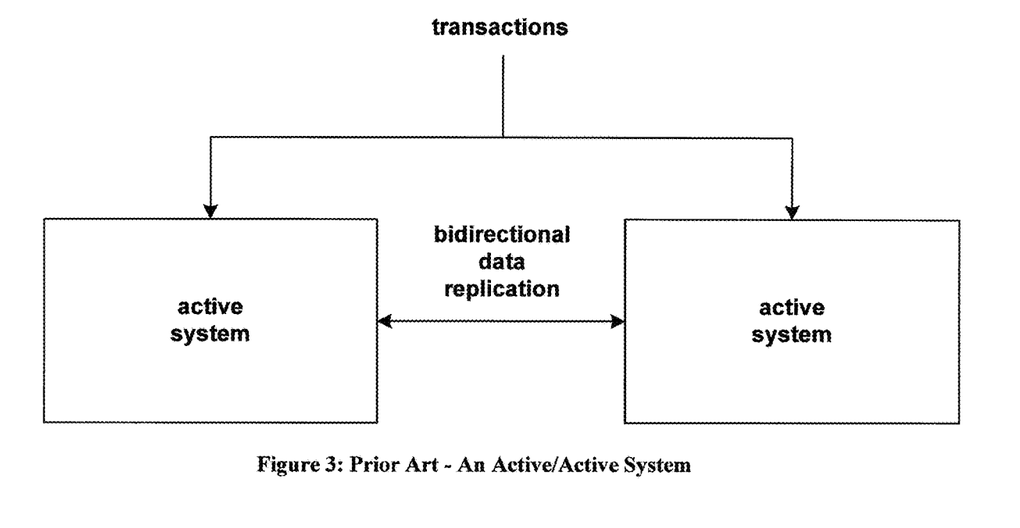
FIG. 3 shows a prior art active/active system with nodes connected by a computer network.

The availability of a computing system can be significantly enhanced by providing a second system that can continue to provide services to the end users should one system fail. The two systems can be configured as an active/backup (or active/standby) system or as an active/active system. The systems are interconnected via a computer network so they can interact with each other. In an active/backup system (FIG. 2), the active system is keeping its backup system synchronized by replicating database changes to it so that the backup system is ready to promptly take over processing should the production system fail. A uni-directional data replication engine is typically used to replicate the database changes from the active system to the standby system. In an active/active system (FIG. 3), both systems are processing transactions. They keep each other synchronized via bi-directional data replication. When one system processes a transaction and makes changes to its database, it promptly replicates those changes to the other system's database. In that way, a transaction can be routed to either system and be processed identically. Should one system fail, all further transactions are routed to the surviving system.

1.8 Database Integrity

It is imperative that the two databases in a redundant system contain matching data and stay in sync with each other. Any differences between them (that are not caused by normal data replication latency) must be quickly identified and resolved, else subsequent processing could return erroneous or inconsistent results. Database errors could be introduced for a variety of reasons, for example due to anomalies in the Audit Trails (Change Logs) that drive the data replication engines, or if some of the data to be replicated is lost. Alternatively, faults in the data replication engine(s) could cause the redundant databases to diverge, or direct updating of only the backup database by the application or users can also cause the divergence. Finally, there are a large number of database mismatch causes which result from user error, malicious activity, hardware failures, and many other sources.

1.9 Methods for Comparing Two Databases to Ensure they Match

Several prior art methods exist for comparing two databases to make sure they match (as discussed below). For example, the SOLV product from Gravic, Inc., USA takes a copy of some (or all) of the data in one of the databases, and sends it to a daemon that reads a similar data set from the other database, comparing each field or column of every record or row in the copy to make sure they match. Using SOLV, extra data, missing data, or data in both databases that has divergent data subsets (e.g., a field or column in a record or row does not match), can be identified and resolved.

Still other prior art database comparison tools will "chunk" the first database into data sets, computing a hash, CRC, token, or other fingerprint representing that data set (collectively "data fingerprint"), and send just the data code to the daemon that reads and computes a data code representing the data set on a similar data set on the other database. This approach lessens the load on the network, however it still requires re-reading the contents of the two databases (or subsets thereof) to perform the comparison, even if most of the data in the database(s) has not changed.

The prior art that compares databases has several features in common:

A. They typically compare a known range (or block) of records—either the entire file, or a specific range (or block) within the file, or a specific sample of records.

B. They typically compare the records using a specific ordering of records (e.g., either physical order or logical order such as a key path). The open source rsync tool, which compares based on physical order in a file, is an example of prior-art.

C. They typically compare all records in the range, whether or not records have changed since the last comparison. In some cases, a statistical sampling of the records is taken, making sure to compare the records selected at a source database table to the same records in a target database table.

D. If comparing blocks of records, any block marked as having been changed typically has its entire contents compared (or used in the comparison).

These characteristics of the prior art lead to limitations in the use of file comparison to continuously validate that two databases are equivalent and remain equivalent as they change over time. Some issues are described below.

1.10 Order-Sequenced File Issues

It is useful when the data content (or a subset of the data content) of some or all of the records/rows is the same, and that is what is needed to be compared. But the location in the file/table for the data content does not always match.

This is the case with order-sequenced files, such as HPE NonStop Entry-Sequenced (E-S) files and E-S SQL tables, although it is not limited to just those file/table types. In the following discussion, E-S files will be the referenced example, though the issues apply generically to other order-sequenced file types.

In the E-S case, a new record or row can only be inserted at the end (current EOF) of the file/table. The order that events are inserted, and/or their physical position in the file or table, may or may not be important to the application using the data. The records/rows may be updated, usually with data of the same size/length. The records/rows may or may not be able to be deleted, although when possible the delete may just set the record length to 0 and leave the space allocated to the 'removed' record/row (in other words, the data is left in the file where it was originally inserted and the space is not reclaimed).

E-S files/tables have a "primary key" (defined as a unique way to identify or find a record/row) that is based on its physical position in the file. The primary key is a bit-encoded integer that consists of a block number and the record/row in the block number. A "block" in this context is an allocation size (usually 512, 1024, 2048, 4096, or more power of two bytes) to optimize disk access and storage. The file/table is made up of many such blocks which are typically allocated as data is inserted into the file.

The challenge with E-S files/tables occurs in data replication environments. There are many reasons why data inserted at the source file/table may not be able to be inserted at the same position in the target file/table. Reasons include:

i. HPE NonStop TMF indeterminacy in disk flushing order not matching the order that the application performed the database I/O in. For example, the application inserts record 0 and then record 1 and then record 2, but these are flushed into the TMF change log/audit trail in a different order. When replicated to the target, the order of the records inserted is different, leading to a different order of the data at the target than at the source.

ii. If the source inserts three records under a transaction and commits that transaction successfully, the source file/table will have record 0, record 1, then record 2 in it. During replication to the target, if the transaction fails for any reason, for example, a CPU failure causes the abort after the three inserts occur but before the commit occurs, the target will have three 'empty' records at positions 0, 1, and 2. If that transaction is then successfully re-replicated to the target, the target will then have the source records 0, 1, and 2, at target positions 3, 4, and 5. In this case, target positions 0, 1, and 2 then have the records in there with a logical length of 0 (a result of the aborted insert), and these are typically inaccessible to applications.

iii. Another reason the records/rows in the target may not match the physical position of those records or rows is related to lower-level file or table efficiency. In some cases, the physical order of the data blocks that hold the records or rows may be reorganized by the file system, for example when the file or table has become fragmented (storage of the data blocks that hold the records or rows are no longer contiguous or sequential). Another reason is when data is loaded, copied, or replicated from the source file or table to the target file or table, certain records or rows may be either collapsed in size or removed from the load, copy, or replication process and not inserted at the target file or table. This can happen, for example, with zero-length records or rows in Entry-sequenced HPE NonStop Enscribe files or SQL tables as these can occur when the underlying TMF transaction aborts (backs out) after an insert.

iv. There are several other reasons why the physical (or logical) order of the data at the target may not match the physical (or logical) order of the data at the source. For example, with files and tables that have one or more of a "SYSKEY" type of field or column in them. One example is for clustering key SQL/MP or SQL/MX tables on an HPE NonStop system. Another example is for Enscribe QUEUE files on an HPE NonStop system. For these files and table types, the file system may assign a unique value whenever that record or row is inserted or updated. These unique values may not be able to be assigned to the source value when the data is replicated, loaded, or copied. They are instead set by the file system when the operation takes place at the target. Hence, the target records or rows will have differing SYSKEY values than their corresponding source record or rows. The present invention can remove these SYSKEY values from the data content being compared to determine if the rest of the record or row matches from source to target.

1.11 What is Needed

In order to be able to compare files and tables with order-sequencing issues, we may need to skip records/rows with certain attributes such as zero length, and/or skip certain fields or columns in the record or row, and focus on comparing some or all of the record/row contents. We thus cannot rely on the primary key, alternate key, or physical or logical location, or even some of the field or columns in the record or row, of the records/rows being the same from the source to the target.

Again, the reasons are many-fold, but the concept is that the records/rows being replicated/inserted at a target database will not necessarily be at the same physical or logical position or have the same "primary key" or other internal fields or columns at the target as they had at a source database. Hence, we cannot rely on using the "primary key" or position of the data, and may have to not use some of the record or row field or column data, to compare the two copies of data.

Hence the needed algorithm cannot rely on the target records/rows being in the same positions as the corresponding source records or rows. The physical position and the "primary key" may not be the same. And, due to what is called landed order issues at the source not necessarily matching the order the I/O's were done in at the source database, for example due to TMF-flushing indeterminacy, the data itself might be in a completely different order at the target as it is at the source.

In addition, in some situations, the data may be successfully replicated from the source to the target, and the primary key may even be preserved, however a restart of the replication process may in some cases resend the data and re-apply that same data at the target when the replication engine was not sure that the data made it successfully to the target in the first place. This can cause duplicates of the source data in the target file/table if, for example, the primary key is not required to be unique.

Compounding this situation, it is possible, given a multi-threaded replication engine, to replicate the source data to the target database using multiple replication threads. This is often done for scaling, loading, and performance reasons. In these scenarios, the target data may be inserted in a different order at the target than it was inserted at the source. This can lead to the same data being in the target, but in a different order (for example, logical or physical) than that data existed at the source.

In summary, what is needed is an algorithm which compares files/tables and takes the following items into account and deals with them for order-sequenced files/tables:

1. The primary key of the source record/row may not match the primary key of the target record or row. This can occur, for example, with entry-sequenced files/tables where the primary key is assigned related to the physical position of the record/row in the source file or table. At the target, that record or row may not be stored at the same primary key value. A similar issue can occur, for example, if the primary key contains a timestamp or similar sequence number (set at insert) and the timestamps (or sequence numbers) of inserts is different from the source to the target (this is common, for example, with HPE NonStop files and tables that use SYSKEYS in the primary key that are assigned by the file system on insert).

2. Partial record compares. Full vs partial source record/row to target record/row data may not compare the entire data/columns in the record or row. In other words, we may only want to compare bytes at offset 10 through end of record, skipping the first 10 bytes (at offsets 0-9) in both source vs target records. Or, perhaps there are additional fields in the target record/row that are not in the source record/row, as can happen when a migration or database upgrade is occurring. In this case, we would want to compare the first N bytes from the source record (first byte to last byte=N in length), however the target has additional fields at positions N+1 through end of record that we want to exclude. The data to be compared vs the data to not be compared can occur at any, or many, points in the record or row.

3. The physical or logical position of the record or row is different from the source to the target file or table. For example, in an ordinal file system, the source record/row might be at position #33, but on the target it might be at position #30 or #35.

4. The algorithm needs to deal with duplicates, caused by the vagaries of TMF, or replication replay issues, among others.

5. The algorithm needs to deal with empty or 0-length data.

6. To identify all discrepancies between the source and the target, and to ultimately make the target match the source, the algorithm needs to identify data in the source not in the target (insert at target needed), data in the target not in the source (delete or removal (e.g. set to 0-length) at target needed), and data in both that has differing content (update at target needed). Or the opposite operation if the source is to be made to match the target (i.e. change of reference polarity).

7. The comparison differences should be optionally able to be converted into repair statements that can then be run to synchronize the source and target files/tables.

8. The source and target file types might be different, such as one is Entry-Sequenced, and the other is Relative or Key-Sequenced.

BRIEF SUMMARY OF THE INVENTION

The following discussion is a brief summary for how the invention operates.

Disclosed is an automated method for comparing two database tables, the "first" and "second" database tables, with each other to optionally produce a table of differences therebetween. The first database table and the second database table include one or more subsets of data that are intended to match each other, and the first database table and the second database table each include multiple rows.

The primary method for comparison consists of generating indicia for each of the multiple rows of the first and second database table. Then the generated indicia for each of the multiple rows of the first database table are compared with the generated indicia for each of the multiple rows of the second database table, however the comparing occurs without regard to the ordering of the rows in either the first database table or the second database table.

If any generated indicia for each of the multiple rows of the first database table are not present in the generated indicia for each of the multiple rows of the second database table, then a first set of mismatched indicia is identified. The converse happens for the second database table's generated indicia to produce a second set of mismatched indicia.

A table of differences is optionally populated from the generated indicia which mismatches. One embodiment repairs the second database table by using at least one of the sets of mismatched indicia or the table of differences.

Definitions

The following definitions describe the use of certain terms in this specification and are provided to promote understanding of the present invention. They are hierarchically ordered in that each definition builds on previous definitions.

Table—A set of data values that is organized using a model of horizontal rows and vertical columns. The columns are identified by name, and the rows are uniquely identified by the values appearing in a particular column subset (the table's primary key). A table usually characterizes an entity set. Each row in the table describes an instance of the entity set. Each column describes an attribute of the entity set.

File—The equivalent of a table for nonrelational databases. A file is made up of records, and each record describes an entity instance. A record is made up of fields, each of which describes an attribute of the entity set. In this specification, the term "table" or "file" is to be interpreted as "table and/or file."

Column—A table component that holds a single attribute, such as SALARY, of the entity set.

Field—A file component that holds a single attribute, such as SALARY, of the entity set. In this specification, the term "column" or "field" is to be interpreted as "column and/or field."

Row—A table component that represents an entity instance. It is represented as a sequence of {column name, value}pairs which can be implemented as a sequence of values positioned according to their corresponding column names. For instance, (EMPLOYEE NUMBER, 235), (NAME, Joe Smith), (DEPARTMENT, Accounting), (SALARY, $30,000).

Record—The same as a row, but "row" is usually used for relational databases; and "record" is usually used for file systems. In this specification, the term "row" or "record" is to be interpreted as "row and/or record."

Database—A collection of related tables or files.

Insert—The addition of a row into a database.

Update—The modification of a row in a database.

Delete—The removal of a row from a database.

Change—An insert, update, or delete.

Function—A logical implementation of a task or service.

Program—An executable set of programming code for providing a specific function or set of functions.

Executable—A program.

System—A processor with memory and input/output devices that can execute a program.

Computer—A system.

Node—A computer that is one of the two or more nodes, i.e. systems, that make up a redundant system.

Process—A program running in a computer. A process provides one or more functions. One program can be spawned as multiple distinguishable processes.

Application—One or more processes cooperating to perform one or more useful functions for end users.

Operating System—A software facility that manages computer hardware resources and provides common services for application processes. Services include time functions, reading and writing interprocess messages, and database manipulation.

End Users—People, systems, devices, applications, or any other entity that can influence an application or can request or use the services that it provides.

Data Replication—A method or procedure for replicating the database changes made to one database (often called the 'source' database), to a second database (often called the 'target' database), typically in order to keep the databases synchronized (having the same or similar content). Data replication can replicate all changes or some changes, and the source and target data formats may be the same or different. In a typical redundant database environment (such as discussed in this document), the source and target databases are meant to contain the same (or similar) information, for example to support classic business continuity failover needs.

Data Replication Latency—the time from when a change is made on the source database to when the replication engine has applied that change against the target database is called the 'data replication latency'. It is often measured in sub-seconds to seconds. However longer latencies can occur, for example, if the network interconnect between the databases is unavailable for a while. It is typical for a source database and a target database to be divergent for the specific data changes being replicated during the data replication latency time period; however, this divergence resolves itself and the data becomes convergent (the same) as the changes are applied to the target database.

Active/Backup System—A redundant system architecture in which an active production system is backed up by a passive system that may be doing other work. Should the active system fail, the backup system is brought into service; and the application continues running on the backup system. Failover from a failed active system to the backup system can take some time, ranging from minutes to hours. Furthermore, the failover may not work (a failover fault). Uni-directional data replication is typically used to keep the databases synchronized.

Active/Active System—A redundant system architecture in which two or more computing systems are actively processing transactions for the same application. Should one system fail, recovery only entails sending further transactions to the surviving system(s). Failover typically can be accomplished in seconds, and there are no failover faults (the surviving systems are known to be working). Bidirectional data replication is typically used to keep the databases synchronized.

Redundant System—A system architecture which consists of two or more systems (i.e. nodes) that are operating in a way to increase the overall availability of the application to end users. Active/Backup and Active/Active Systems are the two primary redundant system architectures. Data replication is typically used to keep the databases in the redundant systems synchronized.

Sizzling-Hot Takeover (SZT) system—An active/active architecture in which only one computing system is processing transactions. An SZT system avoids the problems that an application might face if run in a distributed environment (for example data collisions), but it has the fast and reliable failover characteristics of an active/active system.

Backup—Creating a copy of a database to protect it from loss.

Online Backup—Creating a copy of an active database to protect it from loss.

Restore—Restoring a database into a consistent state by loading a backup copy and typically rolling forward changes that occurred to the backup copy once the backup was started but before it was completed.

Virtual Tape—Emulated magnetic tape images, usually stored on a disk, which may be remote from the source system.

Change Log—A record of changes made to a database. It usually consists of a before image (a copy of the original value of the data that was changed) and an after image (a copy of the final value that the data was changed to be). For example, for an insert change, the before value is null and the after value contains the inserted data. For an update change, the before value is the original data value, and the after value is the final data value. For a delete change, the before value is the original data value, and the after value is null.

Audit Trail—Analogous to a Change Log.

Current Image—The current image is the current value of a data item (eg a record or a row) that is in the database.

Related Data—Data that typically must be consistent between all the data items in the data set. For example, a parent row and a child row in a classic referential integrity relationship are related. Creating the child row without the parent row violates the related data relationship. Updates to the same record or row, or to related records or rows, are related as well—replicating the updates out of order can lead to inconsistent data. Non-related data is data that does not have a consistency requirement.

Consistent Database—A database is consistent if its data is valid according to all defined rules, at least for related data. For instance, a parent row must exist for every child row that refers to it.

Replicated consistent databases or synchronized databases—A pair (or more) of databases is consistent (or synchronized) with each other if the data contents of the databases match (except perhaps for the data changes being replicated during the data replication latency time period).

Record-Oriented Database—A database that is accessed by specifying a key pointing to one or more records. Analogous to a row-oriented database.

Field-Oriented Database—A database that is accessed by specifying a key pointing to a field. Analogous to a column-oriented database.

Primary Key—The primary key is a typically unique identifier for a particular record or row in a file or table. It can be created from one or more fields or columns contained in the record or row, the physical or logical or virtual location of the record or row in the file or table, record or row data content, or based on some other combination of data attributes that can be used to identify and/or locate the record or row.

Alternate Key—An alternate key is a secondary access path to the data (records or rows) in the file or table. Analogous to an index in an SQL relational database or an alternate key in an HPE NonStop Enscribe database.

Relative Key—A relative key is also called a Relative Record Number. A record or row identifier that is based on the physical or logical position of the record or row in the file or table. Often sequential, the records or rows are often a maximum fixed length in size so the position, or offset, of a particular record or row can be quickly computed from the beginning of the file or table via the relative key number.

SYSKEY—This entity is also called a system assigned key value or key values. A SYSKEY is one or more fields or columns that are automatically assigned, typically by the database, when a record or row is inserted into a file or table. They are generally unique within that file or table, and are often used as the whole or part of the primary key of that record or row. The SYSKEYs for the same record or row do not typically match across a replicated, loaded, or copied environment.

Key-sequenced file or table—This is a type of file or table that is organized (logically or physically) based on a primary or alternate key.

Relative file or table—This is a type of file or table that is organized (logically or physically) based on a relative key.

Entry-sequenced file or table—This a file or table that is organized (logically or physically) based on the insertion order of the records or rows into the file or table. Since the records or rows may be varying in length, the primary key of the record or row is often derived from the physical position of the record or row in the file or table.

Unstructured file or table—This is a file or table that has no specific structure to the contents, for example the data can be in any format and not necessarily adhere to a particular or specific record/field or table/column definition. Records or rows in an unstructured file or table can include the entire file or table contents, or be derived from attributes such as a fixed length to the records or rows, a set of one or more tokens to identify the beginning and/or end of the records or rows in the file or table (such as a carriage return/line feed at the end of the record or row), or a field in the data itself that defines the length of each record or row (such as a length field contained in the data that identifies the length of that particular record or row).

Indicia—Indicia are usually based on a Hash value, such as CRC, SHA, MD5 or similar algorithm. These are calculated from sets of data, and they may be used to identify the data with fewer bits/bytes than in the original set of data. For example, a 128-bit hash value for a 100 byte string can be used to generate a 16-byte, or smaller if truncated, value which represents fairly uniquely that 100-byte string. Another 100-byte string with even one different byte will result in the generation of a completely different hash value which will almost certainly not match the hash value for the first 100-byte string. If the hash value algorithm does in fact produce the same hash value for two different input strings, then the strings themselves can always be compared if complete certainty is needed that the sets of data match. In some cases, the indicia may be the full original data, or a subset thereof.

Order-sequenced files/tables—This type of file/table uses some form or ordering method to differentiate the different rows or records of a table/file. The ordering methods might be relative record number, physical order, or a primary or alternate key. Problems addressed by this invention arise in comparing two files/tables if they differ in the ordering method used, or if the ordering method matches, but the actual records/rows in the file/table are out-of-order, e.g. from the results of operating system or database replication processing.

Data content sequenced files/tables—This type of file/table uses the contents of some or all of the data itself to differentiate the different rows or records of a table/file. The physical, logical, or virtual ordering methods of the records or rows may differ from the source to the target.

Hence, some or all of the data content of the records or rows is used to determine what is missing or extra or a duplicate between the source and the target. Problems addressed by this invention arise in comparing two files/tables if the records or rows differ in their data content, for example no explicit ordering method exists for the records or rows as they may be inserted randomly (or differently) at both the source and the target. In some cases, there is only one record or row in the file(s) or table(s) being compared, in which case the set of file(s) or table(s) being compared are treated as separate records or rows of the file or table collection set.

Entry-Sequenced, Key-Sequenced, and Relative Files and Tables—These are types of HPE NonStop Guardian operating system file or SQL table types which are order-sequenced file types.

Unstructured Files—These are types of HPE NonStop Guardian and OSS operating system file types which are order-sequenced via the relative byte address (RBA) position of the data within them. Records inside unstructured files are usually delimited via a fixed length (for example, 100 bytes long), variable length via a length parameter contained in the data itself (for example, via a length field at the front of the each record), token delimited (for example, via strings of one or more characters, or tokens, such as carriage return/line feed, that mark the end of, or length of a record), or comma separated values (CSV) format. In some cases, there is no 'record' delimiter and the entire file, or a portion thereof, itself is considered a single record to be compared.

Source and Target terms—The source database table/file and the target database table/file are terms which refer to database replication and the need for a replicated, or copied, target database to match the source database target. In this disclosure the source database and the target database may be on the same system or distinct systems. The target database system might be located a geographically distant distance from the source database system for business continuity purposes. In an active/active architecture both databases serve as both sources and targets. As a result, the terms "first" and "second" are used interchangeably in this disclosure with the terms source and target to more generically describe the objects upon which the invention operates. Further, the invention does not require that replication to be involved between the first and second database tables. For example, one or both of the tables may be populated by an extract, transform, load (ETL) operation or by dual redundant processing.

File or table partition—every file or table consists of one or more partitions. Often, a file or a table is divided into distinct subfiles called partitions. Each partition generally holds a unique set of the file or table's records or rows. Partitioning is often implemented to spread the data across multiple partitions, and hence disk drives, for better access or processing parallelism and to make very large files or tables fit across multiple smaller disk drives that have smaller size capacity.

File or table sharding—taking a file or table and breaking it up into distinct sets of data to allow for parallel processing on each data set to occur serially and/or in parallel.

BRIEF DESCRIPTION OF THE DRAWINGS

The foregoing summary as well as the following detailed description of preferred embodiments of the invention, will be better understood when read in conjunction with the appended drawings. For the purpose of illustrating the invention, the drawings show presently preferred embodiments. However, the invention is not limited to the precise arrangements and instrumentalities shown. In the drawings.

DETAILED DESCRIPTION OF THE INVENTION

Certain terminology is used herein for convenience only and is not to be taken as a limitation on the present invention.

The words "a" and "an", as used in the claims and in the corresponding portions of the specification, mean "at least one."

Functional Overview

First, the invention has the ability to compute indicia to represent subsets of the data being compared. The indicia can be a checksum such as a cyclic redundancy check (CRC), MD5, SHA, or other hash value to represent the data which will be compared.

A preferred embodiment reads and computes the indicia for subsets of the data to be compared for each of the source database file records/table rows, as well as for each of the target database file records/table rows.

The assumption is that the indicia is unique enough to avoid distinct records or rows computing to the same indicia value. If that can happen with an unacceptably high probability, a comparison of the actual data might be needed to determine match vs mis-match.

Then the source indicia list and target indicia lists can be optionally combined before being sorted. The indicia entries are then compared as follows:

i. For the pairs of indicia where the source indicia and target indicia are equal, a match is indicated. The full data (or a subset) from each source and target record/row can be compared to be certain. Note that there may be several source and target indicia that match, which in the end could indicate duplicate rows being in either the source and/or the target. To the extent that the number of duplicates match between the source and target, the duplicate rows can be considered matches or mismatches depending on whether the dataset allows duplicates.

ii. If the source indicia and target indicia do not have a match, presumably there is an extra record/row in the source or target or a difference in the data content in records that otherwise should match. The possibilities are as follows:
   a. record/row in the source but not target,
   b. record/row in the target but not source, or
   c. record/row in both but contents do not match.

Breaking the source and target files/tables into subsets to perform the comparisons in parallel may be desirable (e.g. to improve comparison speed and lessen duration). One such logical subset can use file/table partitioning, or data sharding, to create the subsets. In the end, mismatches across the subsets should also be compared to remove any that actually match across the subsets. Additionally, 0-length or null records may be included in the comparison, or ignored.

At the end, if the tables/files are not identical, there will be a list of mismatches:

i. records/rows in the source but not target,
ii. records/rows in the target but not source, and/or
iii. records/rows in both where the contents do not match.

These lists may be combined into a table of differences.

Note that records/rows where the contents do not match can be identified if the indicia, row/record contents, keys, or metadata allow matching the records/rows and determining that they should be the same.

If a post-compare repair operation is desired to make the target match the source, or the source match the target, the list of mismatches and duplicates can be accessed to determine the operation to perform (insert, update, or delete). This repair process is called a synchronization operation.

For example, if making the target match the source, then the list of mismatches could be processed as follows:

i. For entries in the source but not target (one or more), insert these records or rows into the target file or table;
ii. For entries in the target but not source (one or more), remove (delete) these records or rows from the target file or table;
iii. For entries in both but contents do not match, update the records or rows in the target to match the corresponding source data for the parts of the record or row that did not match.

Similarly, if making the source match the target, then the list of mismatches could be processed as follows:

i. For entries in the target but not source (one or more), insert these records or rows into the source file or table;
ii. For entries in the source but not target (one or more), remove (delete) these records or rows from the source file or table;
iii. For entries in both but contents do not match, update the records or rows in the source to match the corresponding target data for the parts of the record or row that did not match.

Note that when fixing the source or target row/record that it may be possible to decompose an update operation into a delete of the incorrect record/row followed by an insert of the correct record/row.

In some architectures, notably those using a data replication engine to keep the source and target databases synchronized, it may be desirable to leverage the data replication engine to perform the synchronization operation. This is especially useful when the data replication engine is transforming the data in some way, perhaps to cleanse numeric or date/time fields or columns during replication. In this case, the data replication source file or table should be updated to reflect the change needed (potentially, just by re-applying the current values), and then the change can flow through the data replication engine to the target database and be applied there into the target file or table.

This algorithm works regardless of the physical structure of the source and target files/tables: they can be the same, for example both structured or data content sequenced, or vastly different. For example, the algorithm works even if the data blocks, partitioning, or block sizes differ between the source and the target. Also, even the file types can be different, for example, comparing a key-sequenced file/table against an entry-sequenced file/table, or a structured file against a data content sequenced file or table.

In order for the comparison to verify a consistent database on both the source and target systems, all related data for the rows/records may be compared at the same time. For example, the related records might include all of the child rows for each parent row being compared between the two parent tables.

Comparison Example

Figure 4:
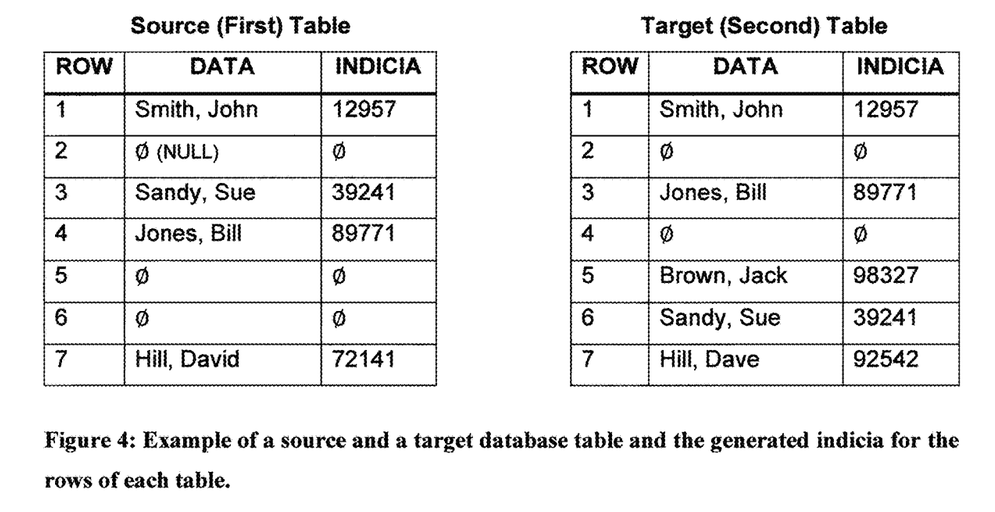
FIG. 4 shows an example of a source and a target database table and the generated indicia for the rows of each table.
Figure 5:
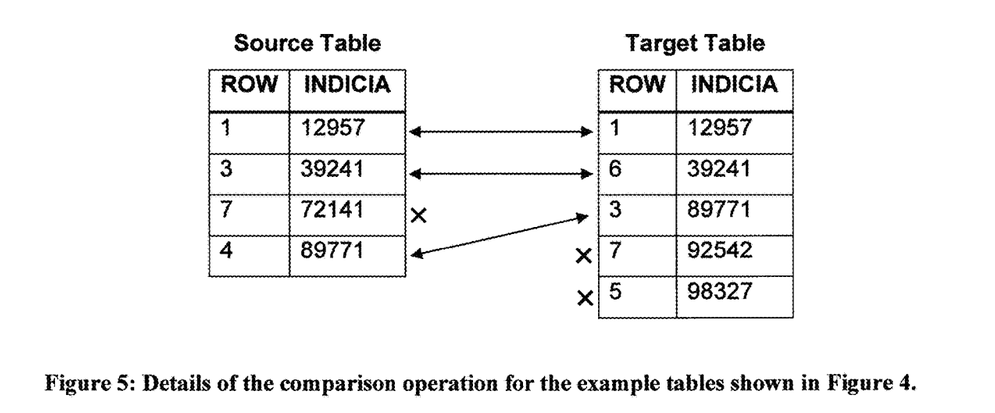
FIG. 5 shows details of the comparison operation for the example tables shown in FIG. 4.

An example for how a preferred embodiment works is shown in FIGS. 4 and 5.

First, FIG. 4 shows a source database table with four valid rows, and a target database table with five database rows. The rows are indicated by a row number (Row #) and the generated indicia for the rows of each table is contained in the Generated Indicia column. The database tables contain similar data values, but the contents have diverged.

FIG. 5 shows details of the comparison operation for the example tables shown in FIG. 4. The generated indicia for the source table is sorted in the block on the left. Conversely, the generated indicia for the target table is sorted in the block on the right.

Figure 6:
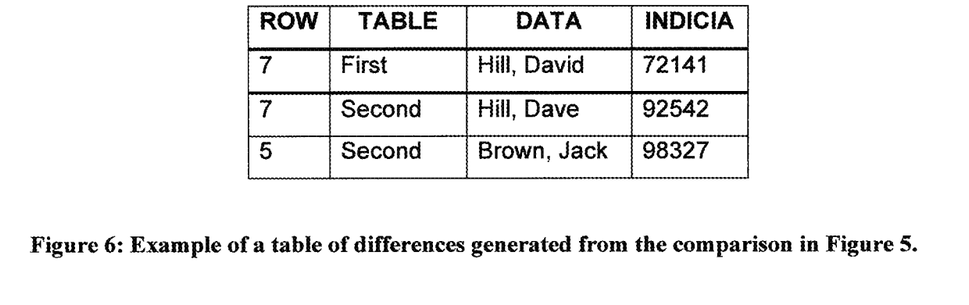
FIG. 6 shows an example of a table of differences generated from the comparison in FIG. 5.

The comparison of the generated indicia can then progress as shown in a logical order, without regard for the original order of the data in the source table and target table. Rows that match are linked up by a solid line. Rows that do not match for one reason or other are marked with an X. A table of differences is then shown in FIG. 6 for all of the generated indicia that does not match.

Flowchart for a Preferred Embodiment

Figure 7:
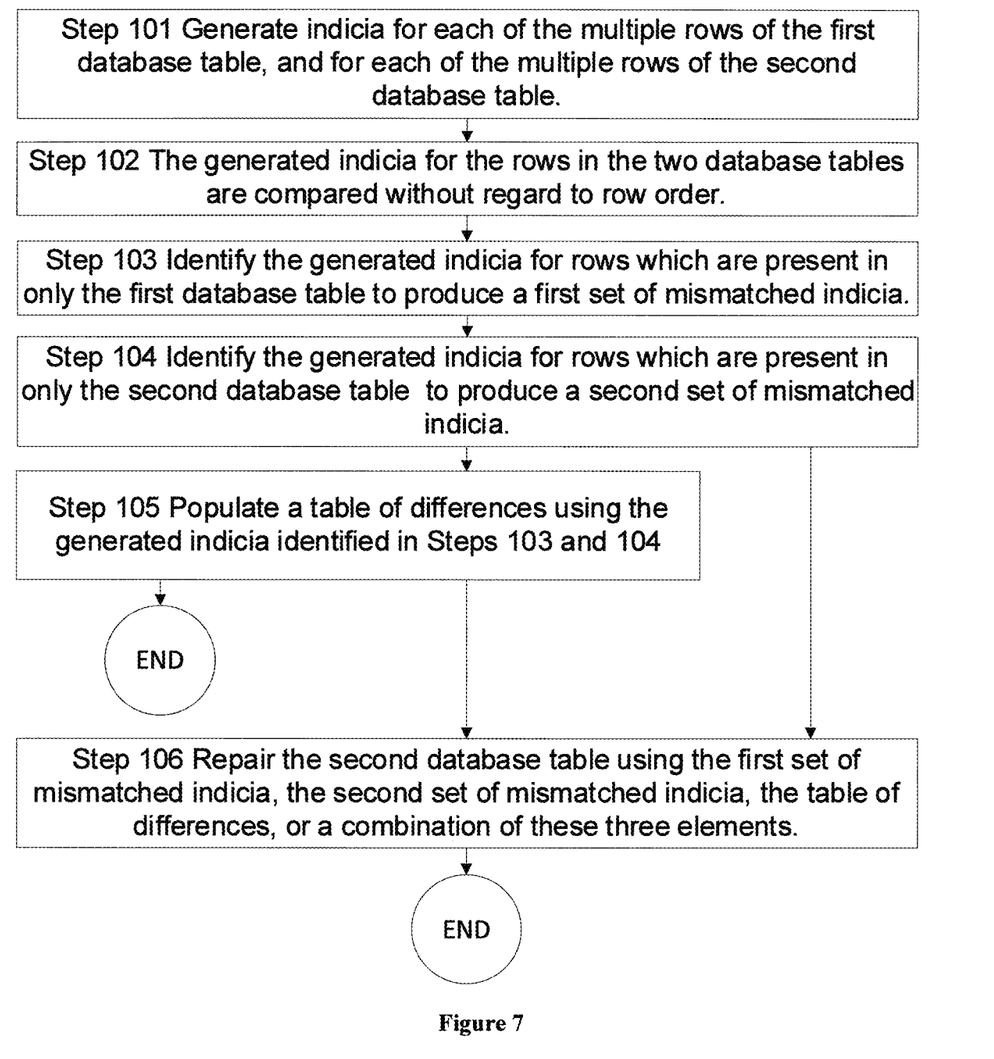
FIG. 7 shows a flowchart for a preferred embodiment of an automated method for comparing a source database table and a target database table, and optionally repairing the differences in the second database table without regard for the order of the rows in either database table.
Figure 8:
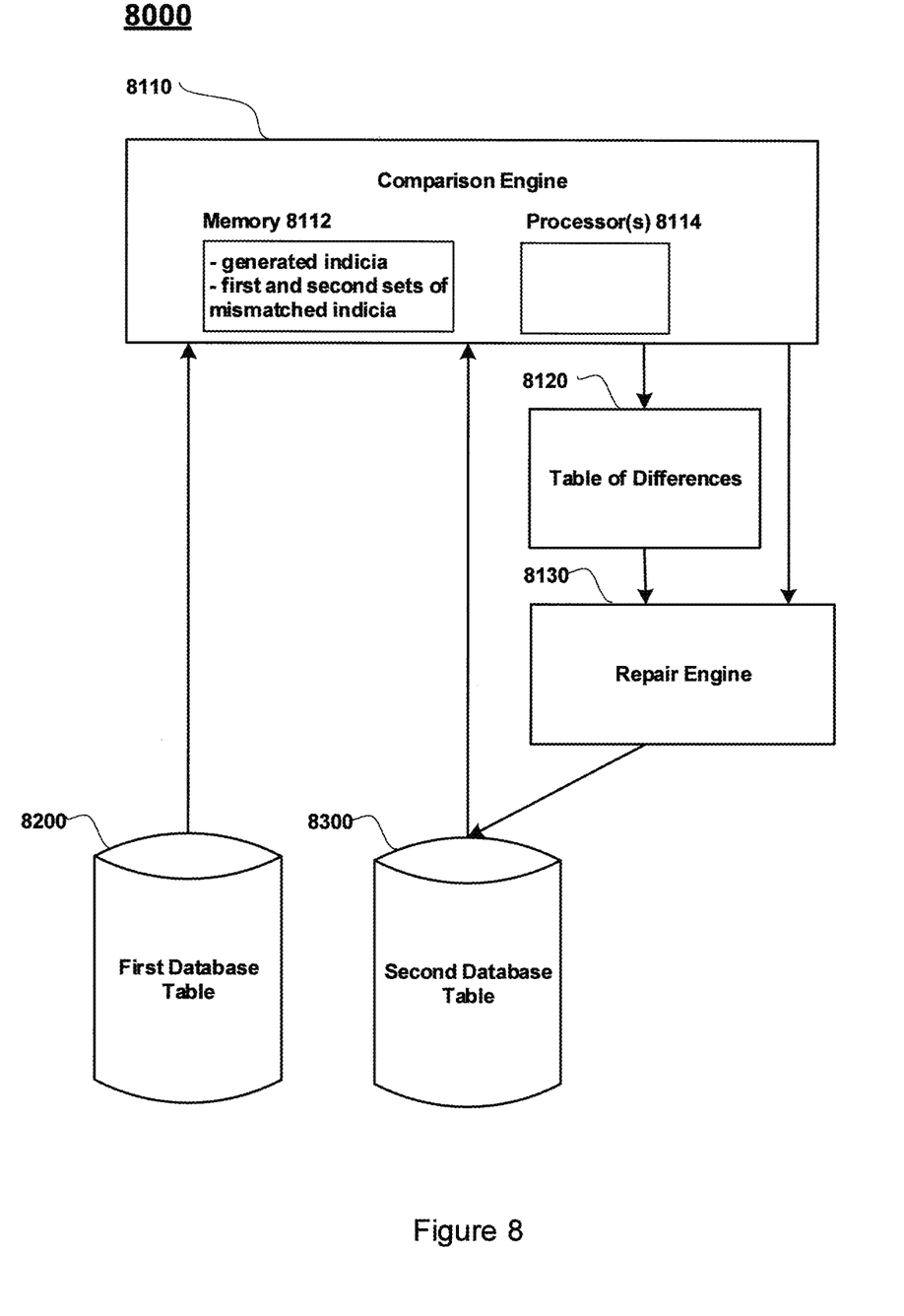
FIG. 8 is a system for implementing the steps in the flowchart of FIG. 7.

FIG. 7 is a flowchart in accordance with one preferred embodiment of the present invention, and FIG. 8 is a system (apparatus) 8000 in accordance with one preferred embodiment of the present invention. FIGS. 7 and 8 are described together.

More specifically, FIG. 7 is a flowchart for a preferred embodiment for comparing a first database table 8200 and a second database table 8300 with each other to either produce a table of differences therebetween and/or repair the second database table. The first database table 8200 and the second database table 8300 each include multiple rows which include one or more subsets of data that are intended to match each other.

During Step 101, indicia is generated for (i) each of the multiple rows of the first database table 8200, and, (ii) each of the multiple rows of the second database table 8300. The generated indicia are stored in memory 8112 of comparison engine 8110. The comparison engine 8110 includes one or more processors 8114 which perform the comparison functions and which also generate the indicia.

During Step 102, comparisons of the generated indicia for each of the multiple rows of the first database table 8200 with the generated indicia for each of the multiple rows of the second database table 8300 are made in the comparison engine 8110. The comparisons occur without regard to an order of the rows in either the first database table 8200 or the second database table 8300.

During Step 103, generated indicia for each of the multiple rows of the first database table 8200 that are not present in the generated indicia for each of the multiple rows of the second database table 8300 are identified, thereby producing a first set of mismatched indicia which is stored in the memory 8112.

During Step 104, generated indicia for each of the multiple rows of the second database table 8300 that are not present in the generated indicia for each of the multiple rows of the first database table 8200 are identified, thereby producing a second set of mismatched indicia which is stored in the memory 8112; and either:

(i) During Step 105, a table of differences 8120 with the generated indicia identified in Steps 103 and 104 is populated, and/or alternately,
  (ii) During Step 106, the second database table 8300 is repaired by a repair engine 8130 by using at least one of the first set of mismatched indicia and the second set of mismatched indicia, or the table of differences 8120 produced in Step 105.

The repairing step 106 is optional. That is, the process may stop with the generation of the table of differences 8120, or it may also perform the repair. Likewise, the process may perform the repair without generating the table of differences 8120.

Variations on this embodiment include:

1. The repairing occurs by using the first set of mismatched indicia to insert or update corresponding rows from the first database table 8200 into the second database table 8300.

2. The repairing occurs by using the second set of mismatched indicia to delete corresponding rows from the second database table 8300.

3. The generated indicia are a hash, CRC, SHA-1, and/or SHA-2 value.

4. The generated indicia are generated from a subset of data in the multiple rows. The subset might be a subset of the columns of the row, a range of bytes, or a string search for specific characters.

5. During Step 102, the comparison includes first sorting the generated indicia.

6. During Step 102, the comparison of the generated indicia is followed by a byte-by-byte comparison of the data used to generate the indicia.

7. During Step 105, the table of differences 8120 is kept in memory.

8. During Step 106, the repairing occurs immediately upon identifying mismatched indicia in either the first or second set of mismatched indicia.

9. During Step 106, the repairing occurs by using the first set of mismatched indicia to insert or update corresponding rows from the first database table 8200 into the second database table 8300.

10. During Step 106, the repairing occurs by using the second set of mismatched indicia to delete corresponding rows from the second database table 8300.

11. During Step 102, in order for the comparison to verify a consistent database on both the source and target systems, all related data for the rows/records may be compared at the same time. The related records might include all of the child rows for each parent row being compared between the two parent tables.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. An automated method for comparing a first database table and a second database table with each other to produce a table of differences therebetween, wherein the first database table and the second database table include one or more subsets of data that are intended to match each other, the first database table and the second database table each including multiple rows, the method comprising:
   (a) generating, by a processor, indicia for:
      (i) each of the multiple rows of a subset of the first database table, wherein the subset of the first database table includes less than all of the rows of first database table, and
      (ii) each of the multiple rows of a subset of the second database table;
   (b) comparing, in a comparison engine, the generated indicia for each of the multiple rows of the subset of the first database table with the generated indicia for each of the multiple rows of the subset of the second database table on a row-by-row basis, wherein the comparing occurs without regard to an original order of the rows in either the first database table or the second database table;
   (c) identifying, by the comparison engine, any generated indicia for each of the multiple rows of the subset of the first database table that are not present in the generated indicia for each of the multiple rows of the subset of the second database table, thereby identifying a first set of mismatched indicia;
   (d) identifying, by the comparison engine, any generated indicia for each of the multiple rows of the subset of the second database table that are not present in the generated indicia for each of the multiple rows of the subset of the first database table, thereby identifying a second set of mismatched indicia; and
   (e) populating the table of differences with the generated indicia identified in steps (c) and (d).

2. The method of claim 1 further comprising:
   (f) repairing the second database table by using at least one of the first set of mismatched indicia and the second set of mismatched indicia.

3. The method of claim 2 wherein the repairing occurs by using the first set of mismatched indicia to insert or update corresponding rows from the first database table into the second database table.

4. The method of claim 2 wherein the repairing occurs by using the second set of mismatched indicia to delete corresponding rows from the second database table.

5. The method of claim 1 wherein the generated indicia is a hash.

6. The method of claim 5 wherein the hash is one of CRC, MD5, SHA-1, and SHA-2.

7. The method of claim 1 wherein each of the multiple rows to be compared includes related data for the rows to be compared.

8. The method of claim 7 wherein the related data includes child rows for each parent row being compared between two parent tables.

9. The method of claim 1 wherein the comparing includes sorting the generated indicia prior to the comparing.

10. The method of claim 1 wherein the table of differences is in memory.

11. The method of claim 1 wherein the comparing is followed by a byte-by-byte comparison of the data used to generate the indicia.

12. The method of claim 1 further comprising, prior to step (e):
   (f) comparing additional subsets of data that are intended to match each other to create additional records in the table of differences; and
   (g) matching records in the table of differences across subsets to identify and eliminate records in the table of differences which match records in the table of differences from other subsets.

13. The method of claim 1 wherein each row has multiple columns, and wherein the indicia generated for each of the multiple rows is generated using a subset of the columns of the rows.

14. The method of claim 1 wherein the subset of the first database table is one or more partitions of the first database table, and the subset of the second database table is one or more partitions of the second database table.

15. An automated method for comparing a first database table and a second database table with each other in order to repair the second database table, wherein the first database table and the second database table include one or more subsets of data that are intended to match each other, the first database table and the second database table each including multiple rows, the method comprising:
   (a) generating, by a processor, indicia for:
      (i) each of the multiple rows of a subset of the first database table, wherein the subset of the first database table includes less than all of the rows of first database table, and
      (ii) each of the multiple rows of a subset of the second database table;
   (b) comparing, in a comparison engine, the generated indicia for each of the multiple rows of the subset of the first database table with the generated indicia for each of the multiple rows of the subset of the second database table on a row-by-row basis, wherein the comparing occurs without regard to an original order of the rows in either the first database table or the second database table;
   (c) identifying, by the comparison engine, any generated indicia for each of the multiple rows of the subset of the first database table that are not present in the generated indicia for each of the multiple rows of the subset of the second database table, thereby identifying a first set of mismatched indicia;
   (d) identifying, by the comparison engine, any generated indicia for each of the multiple rows of the subset of the second database table that are not present in the generated indicia for each of the multiple rows of the subset of the first database table, thereby identifying a second set of mismatched indicia; and
   (e) repairing the second database table by using at least one of the first set of mismatched indicia and the second set of mismatched indicia.

16. The method of claim 15 wherein the repairing occurs immediately upon identifying mismatched indicia in either the first or second set of mismatched indicia.

17. The method of claim 15 wherein the repairing occurs by using the first set of mismatched indicia to insert or update corresponding rows from the first database table into the second database table.

18. The method of claim 15 wherein the repairing occurs by using the second set of mismatched indicia to delete corresponding rows from the second database table.

19. The method of claim 15 wherein each row has multiple columns, and wherein the indicia generated for each of the multiple rows is generated using a subset of the columns of the rows.

20. The method of claim 15 wherein the subset of the first database table is one or more partitions of the first database table, and the subset of the second database table is one or more partitions of the second database table.

21. An apparatus comprising:
   (a) first memory configured to store a first database table and a second database table, wherein the first database table and the second database table include one or more subsets of data that are intended to match each other, the first database table and the second database table each including multiple rows;
   (b) second memory configured to store a table of differences that stores differences between the first database table and the second database table;
   (c) a first processor configured to generate indicia for:
      (i) each of the multiple rows of a subset of the first database table, wherein the subset of the first database table includes less than all of the rows of first database table, and
      (ii) each of the multiple rows of a subset of the second database table; and
   (d) a comparison engine including a second processor configured to:
      (i) compare the generated indicia for each of the multiple rows of the subset of the first database table with the generated indicia for each of the multiple rows of the subset of the second database table on a row-by-row basis, wherein the comparing occurs without regard to an original order of the rows in either the first database table or the second database table,
      (ii) identify any generated indicia for each of the multiple rows of the subset of the first database table that are not present in the generated indicia for each of the multiple rows of the subset of the second database table, thereby identifying a first set of mismatched indicia, and
      (iii) identify any generated indicia for each of the multiple rows of the subset of the second database table that are not present in the generated indicia for each of the multiple rows of the subset of the first database table, thereby identifying a second set of mismatched indicia,
   wherein the table of differences is populated with the generated indicia.

22. The apparatus of claim 21 wherein the generated indicia is a hash.

23. The apparatus of claim 21 wherein each of the multiple rows to be compared includes related data for the rows to be compared.

24. The apparatus of claim 21 wherein the comparing includes sorting the generated indicia prior to the comparing.

25. The apparatus of claim 21 wherein the comparison engine including the second processor is further configured to:
   (iv) compare additional subsets of data that are intended to match each other to create additional records in the table of differences, and
   (v) match records in the table of differences across subsets to identify and eliminate records in the table of differences which match records in the table of differences from other subsets.

26. The apparatus of claim 21 wherein each row has multiple columns, and wherein the indicia generated for each of the multiple rows is generated using a subset of the columns of the rows.

27. The apparatus of claim 21 wherein the subset of the first database table is one or more partitions of the first database table, and the subset of the second database table is one or more partitions of the second database table.

28. An apparatus comprising:
   (a) first memory configured to store a first database table and a second database table, wherein the first database table and the second database table include one or more subsets of data that are intended to match each other, the first database table and the second database table each including multiple rows;
   (b) a first processor configured to generate indicia for:
      (i) each of the multiple rows of a subset of the first database table, wherein the subset of the first database table includes less than all of the rows of first database table, and
      (ii) each of the multiple rows of a subset of the second database table;
   (c) a comparison engine including a second processor configured to:
      (i) compare the generated indicia for each of the multiple rows of the subset of the first database table with the generated indicia for each of the multiple rows of the subset of the second database table on a row-by-row basis, wherein the comparing occurs without regard to an original order of the rows in either the first database table or the second database table,
      (ii) identify any generated indicia for each of the multiple rows of the subset of the first database table that are not present in the generated indicia for each of the multiple rows of the subset of the second database table, thereby identifying a first set of mismatched indicia, and
      (iii) identify any generated indicia for each of the multiple rows of the subset of the second database table that are not present in the generated indicia for each of the multiple rows of the subset of the first database table, thereby identifying a second set of mismatched indicia; and
   (d) a repair engine configured to repair the second database table by using at least one of the first set of mismatched indicia and the second set of mismatched indicia.

29. The apparatus of claim 28 further comprising:
   (e) second memory configured to store a table of differences that stores differences between the first database table and the second database table, wherein the table of differences is populated with the generated indicia, and
   wherein the repair engine is configured to repair the second database table by further using the generated indicia stored in the table of differences.

30. The apparatus of claim 28 wherein each row has multiple columns, and wherein the indicia generated for each of the multiple rows is generated using a subset of the columns of the rows.

31. The apparatus of claim 28 wherein the subset of the first database table is one or more partitions of the first database table, and the subset of the second database table is one or more partitions of the second database table.

* * * * *